United States Patent
You et al.

(10) Patent No.: US 7,681,059 B2
(45) Date of Patent: Mar. 16, 2010

(54) COMPUTER SLEEP/AWAKE CIRCUIT

(75) Inventors: Yong-Xing You, Shenzhen (CN); Feng-Long He, Shenzhen (CN); Ke-You Hu, Shenzhen (CN); Hui Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 669 days.

(21) Appl. No.: 11/309,429

(22) Filed: Aug. 4, 2006

(65) Prior Publication Data
US 2007/0214371 A1 Sep. 13, 2007

(30) Foreign Application Priority Data
Mar. 10, 2006 (CN) .................... 2006 1 0034351.X

(51) Int. Cl.
*G06F 1/32* (2006.01)
(52) U.S. Cl. ...................... 713/323; 713/310

(58) Field of Classification Search ................. 713/300, 713/310, 320, 322, 323, 324
See application file for complete search history.

(56) References Cited

U.S. PATENT DOCUMENTS

| | | | |
|---|---|---|---|
| 6,584,573 B1 | 6/2003 | Wunderlich et al. | |
| 7,346,933 B2 * | 3/2008 | Gliniecki et al. | 726/34 |
| 2002/0099960 A1 * | 7/2002 | Klein | 713/202 |
| 2002/0147931 A1 | 10/2002 | Liu | |
| 2005/0182962 A1 * | 8/2005 | Given et al. | 713/200 |

FOREIGN PATENT DOCUMENTS

CN 1543036 A 11/2004

* cited by examiner

*Primary Examiner*—Dennis M Butler
(74) *Attorney, Agent, or Firm*—Wei Te Chung

(57) ABSTRACT

A sleep/awake circuit includes an infrared receiving/sending module, a micro-control circuit, and a bus control circuit. The micro-control circuit sends a command signal to the infrared receiving/sending module at predetermined intervals. The infrared receiving/sending module detects the presence or absence of a user and then sends a signal back to the micro-control circuit indicating a result. According to the result, the micro-control circuit exchanges data and clock signals with the bus control circuit. The bus control circuit then sends control signals to the computer to control sleep/awake states of the computer.

13 Claims, 2 Drawing Sheets

COMPUTER SLEEP/AWAKE CIRCUIT

FIELD OF THE INVENTION

The present invention relates to a sleep/awake circuit, and more particularly to a circuit for automatically setting a sleep/awake state of a computer.

DESCRIPTION OF RELATED ART

With the rapid development of personal computers, development of high performance components of a computer have brought about a corresponding increase in power use. Therefore wasting of power becomes more likely if the computer is not changed to a power saving state when not in use.

Typically, a sleep/awake circuit is made in designing computer power management for solving the above problem. There is usually a sleep/awake button on a keyboard of a computer that is connected to the inner sleep/awake circuit of a motherboard of the computer. The button is pressed by a user for putting the computer to sleep. Then when the user wishes, presses the same button again to awaken the computer.

However, the user may forget to press the button when the computer is not needed in a waking mode. Then power is wasted, and costs of operating the computer are increased for the user.

What is desired, therefore, is a sleep/awake circuit for automatically changing a sleep/awake state of a computer whenever needed.

SUMMARY OF THE INVENTION

In one preferred embodiment, a computer automatic sleep/awake circuit includes an infrared receiving/sending module, a micro-control circuit, and a bus control circuit. The micro-control circuit sends a command signal to the infrared receiving/sending module at predetermined intervals. The infrared receiving/sending module detects the presence or absence of a user and then sends a signal back to the micro-control circuit indicating a result. According to the result, the micro-control circuit exchanges data and clock signals with the bus control circuit. The bus control circuit then sends control signals to the computer to control sleep/awake states of the computer.

Other advantages and novel features will become more apparent from the following detailed description of preferred embodiments when taken in conjunction with the accompanying drawings, in which:

DETAILED DESCRIPTION OF THE INVENTION

Figure 1:
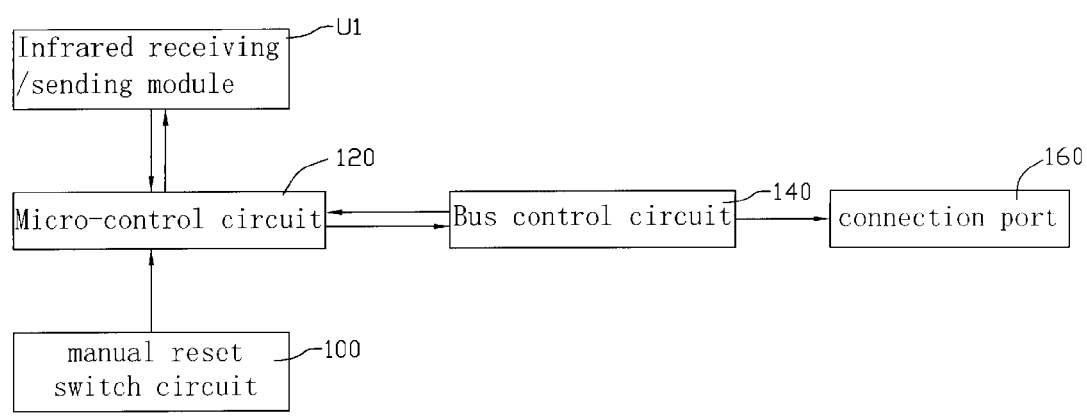
FIG. 1 is a block diagram of a computer sleep/awake circuit in accordance with a preferred embodiment of the present invention.
Figure 2:
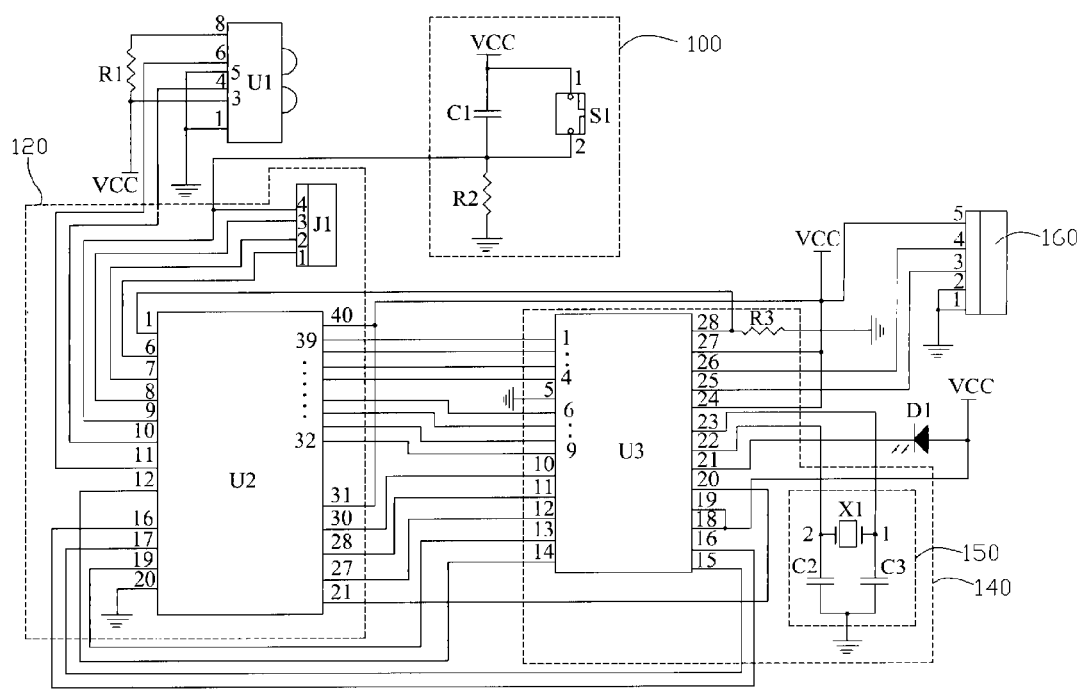
FIG. 2 is a circuit diagram of the computer sleep/awake circuit of FIG. 1.

Referring to FIGS. 1 and 2, a computer sleep/awake circuit of a preferred embodiment of the present invention includes an infrared receiving/sending (IR) module U1, a micro-control circuit 120, a bus control circuit 140, and a connection port 160. The IR module U1 first receives a command signal sent by the micro-control circuit 120 at certain intervals to detect presence or absence at an operation position of a user of an electronic device like a computer, and then sends a result to the micro-control circuit 120. According to the result, the micro-control circuit 120 exchanges data and clock signals with the bus control circuit 140. The bus control circuit 140 is electrically connected to a USB port of the computer via the connection port 160 for controlling sleep/awake states of the computer.

The IR module U1 may be any one of a suitable IR device that is Infrared Data Association (IrDA) compliant and connectable to the computer, for detecting a human presence and is positioned on or about the computer so that it may detect a presence or absence of the user. In this embodiment the IR module has six connection pins 1, 3, 4, 5, 6, 8. Pin 8 is coupled to a system voltage VCC via a resistor R1. Pin 3 is connected to the system voltage VCC. Pins 1 and 5 are grounded.

The micro-control circuit 120 includes a micro controller unit (MCU) U2 and a serial program interface J1. In the preferred embodiment of the present invention, the MCU U2 is an AT89S51 produced by ATMEL Corporation. Pins 1, 2 of the serial program interface J1 are respectively connected to input/output pins 6, 7 of the MCU U2. An input pin 8 of the MCU U2 is coupled to a pin 3 of the serial program interface J1. A reset pin 9 of the MCU U2 is connected to a pin 4 of the serial program interface J1. Sleep/awake control programs for the computer are written to the MCU U2 via the serial program interface J1. A pin 10 of the MCU U2 is connected to pin 4 of the IR module U1 for receiving the result signals sent back by the IR module U1. A pin 11 of the MCU U2 is connected to pin 6 of the IR module U1 for sending command signals to the IR module U1. According to the command signals, the IR module U1 emits infrared signals at certain intervals for detecting the presence or the absence of the user. A power pin 40 of the MCU U2 is connected to the VCC. An earth pin 20 of the MCU U2 is grounded.

The bus control circuit 140 includes a bus controller U3 and a clock circuit 150. In the preferred embodiment of the present invention, the bus controller U3 is a universal serial bus (USB) controller PDIUSBD12 produced by the Philips Corporation. Data pins 1 to 4, and 6 to 9 of the bus controller U3 are connected to data pins 39 to 32 of the MCU U2 respectively. A pin 10 of the bus controller U3 is connected to a pin 30 of the MCU U2. A pin 11 of the bus controller U3 is connected to a pin 28 of the MCU U2. Data exchange occurs between the bus controller U3 and the MCU U2 when the pin 28 of the MCU U2 is at a low level. A suspend pin 12 is coupled to a pin 27 of the MCU U2. The bus controller U3 is made inactive after a corresponding signal sent by the MCU U2 when the bus is idle for a predetermined interval. An output clock pin 13 of the bus controller U3 is connected to an input clock pin 19 of the MCU U2 for providing clock signals to the MCU U2. An interrupt pin 14 of the bus controller U3 is connected to an interrupt pin 12 of the MCU U2. A pin 28 of the bus controller U3 is coupled to a pin 1 of the MCU U2, and is grounded via a resistor R3. Power pins 24, 27 of the bus controller U3 are connected to the VCC. A reset pin 20 of the bus controller U3 is connected to a pin 21 of the MCU U2. The bus indicator light pin 21 is connected to a cathode of an LED D1. An anode of the LED D1 is connected to the VCC. Pins 18, 19 of the bus controller U3 are coupled to the VCC. Read (RE-N), write (WR-N) pins 15, 16 of the bus controller U3 are respectively connected to pins 17, 16 of the MCU U2. An earth pin 5 of the bus controller U3 is grounded.

The clock circuit 150 includes a Crystal Oscillator (CO) X1, and two capacitors C2, C3. One end of each capacitor C2 and C3 is grounded. The other end of the capacitor C2 is connected to a terminal 2 of the CO X1 and an input clock pin 22 of the bus controller U3 simultaneously, and the other end of the capacitor C3 is connected to a terminal 1 of the CO X1 and another input clock pin 23 of the bus controller U3 simultaneously. The clock circuit 150 provides clock signals for the bus controller U3.

In the preferred embodiment, the sleep/awake circuit is formed in a separate enclosure with the connection port 160 USB port compatible. In other embodiments, the sleep/awake circuit may be incorporated on a circuit board of the computer.

The connection port 160 is connected to a USB port of the computer. A power pin 5 of the connection port 160 is connected to the VCC. Earth pins 1, 2 of the connection port 160 are grounded. Data pins 4, 3 of the connection port 160 are connected to bus data output pins 26, 25 of the bus controller U3 respectively. When the computer detects and accepts the connection with the sleep/awake circuit the LED D1 will light.

According to the program, the MCU U2 sends command signals to the IR module U1 at certain intervals. The IR module U1 then emits infrared signals directed at a space that would normally be occupied by the user when at the computer. If the IR module U1 fails to receive reflected signals, then the user of the computer has left, and a user absent result signal is sent to the MCU U2 by the IR module U1. The MCU U2 then sends signals to activate the bus controller U3 and command the bus controller U3 to put the computer in a sleep state. The bus controller U3 via the connection port 160 activates the sleep state of the computer. The bus controller U3 then sends a signal to the MCU U2 indicating the computer is in the sleep state. The MCU U2 then sends a reset signal to reset the bus controller U3, and the bus controller U3 then becomes inactive after resetting. At the same time, the infrared detecting process continues. When the presence of the user is detected by the IR module U1 receiving reflected signals, the IR module U1 sends a user present signal to the MCU U2. The MCU U2 then sends signals to activate the bus controller U3 and command the bus controller U3 to put the computer in an awake state. The bus controller U3 via the connection port 160 activates the awake state of the computer. The bus controller U3 then sends a signal to the MCU U2 indicating the computer is in the awake state. The MCU U2 then sends a reset signal to reset the bus controller U3, and the bus controller U3 then becomes inactive after resetting. The computer is thus automatically awakened.

The circuit further includes a manual reset switch circuit 100 for manual resetting the circuit when needed. The manual reset switch circuit 100 includes a manual button S1, a capacitor C1, and a resistor R2. The manual button S1 parallel connected with the capacitor C1, and then both are placed between the VCC that is connected to a terminal 1 of the manual button S1 and one end of the resistor R2. The other end of the resistor R2 is grounded. The reset pin 9 of the MCU U2 is connected to a terminal 2 of the manual button S1. In the using of the USB equipment, manual reset is needed to make the USB equipment to recover the normal working states when reset by the program of the MCU U2 fails.

It is to be understood, however, that even though numerous characteristics and advantages of the preferred embodiments have been set forth in the foregoing description, together with details of the structures and functions of the embodiments, the disclosure is illustrative only, and changes may be made in detail, especially in matters of shape, size, equivalent material and arrangement of parts within the principles of the invention to the full extent indicated by the broad general meaning of the terms in which the appended claims are expressed.

What is claimed is:

1. A computer sleep/awake circuit comprising:
    an infrared receiving/sending module sending and receiving infrared detecting signals;
    a micro-control circuit connected to the infrared receiving/sending module for sending command signals to the infrared receiving/sending module and receiving returned detecting signals, wherein the micro-control circuit comprises a micro controller unit and a serial program interface connected to the micro controller unit, wherein sleep/awake control programs for a computer comprising the computer sleep/awake circuit are written to the micro controller unit via the serial program interface;
    a manual reset switch circuit connected with the micro-control circuit for manually resetting the micro-control circuit; and
    a bus control circuit connected between the micro-control circuit and a port of the computer for exchanging data and clock signals with the micro-control circuit and outputting corresponding control signals to the computer to control sleep/awake states of the computer.

2. The computer sleep/awake circuit as claimed in claim 1, further comprising a connection port, the connection port receiving data signals from the bus control circuit and sending the data signals to the computer for controlling the sleep/awake states of the computer.

3. The computer sleep/awake circuit as claimed in claim 1, wherein a module setting pin of the infrared receiving/sending module is coupled to a system voltage.

4. The computer sleep/awake circuit as claimed in claim 1, wherein the micro controller unit sends orders to the infrared receiving/sending module to make the infrared receiving/sending module emit user detecting infrared signals to detect a presence or absence of a user, and receives the detecting signals returned by the infrared receiving/sending module.

5. The computer sleep/awake circuit as claimed in claim 1, wherein the bus control circuit comprises a bus controller and a clock circuit, the clock circuit providing clock signals for the bus control circuit, the micro controller unit exchanging data with the bus controller via data pins, an output clock pin of the bus controller connected to an input clock pin of the micro controller unit for providing clock signals needed by the micro controller unit.

6. The computer sleep/awake circuit as claimed in claim 5, wherein the clock circuit comprises a crystal oscillator and two capacitors for providing clock signals for the bus controller.

7. The computer sleep/awake circuit as claimed in claim 1, wherein the manual reset switch circuit comprises a manual button, a capacitor, and a resistor; the manual button connected in parallel with the capacitor and then coupled between a system voltage and one end of the resistor.

8. A sleep/awake circuit comprising:
    an infrared receiving/sending module sending and receiving infrared detecting signals;
    a micro-control circuit comprising a micro controller unit and a serial program interface connected to the micro controller unit, the micro controller unit connected to the infrared receiving/sending module for sending command signals to the infrared receiving/sending module and receiving returned detecting signals, wherein sleep/awake control programs for a device are written to the micro controller unit via the serial program interface;
    a bus control circuit comprising a bus controller and a clock circuit for providing clock signals for the bus controller, the bus controller connected to the micro-control circuit for exchanging data and clock signals with the micro-control circuit and outputting corresponding control signals to control sleep/awake states of the device; and
    a manual reset switch circuit connected with the micro-control circuit for manually resetting the sleep/awake circuit.

9. The sleep/awake circuit as claimed in claim 8, wherein a module setting pin of the infrared receiving/sending module is coupled to a system voltage.

10. The sleep/awake circuit as claimed in claim 9, wherein the micro controller unit sends commands to the infrared receiving/sending module to make the module emit user detecting infrared signals and receives the detecting signals returned by the module.

11. The sleep/awake circuit as claimed in claim 10, wherein the micro controller unit exchanging data with the bus controller via data pins, an output clock pin of the bus controller connected to an input clock pin of the micro controller unit for providing clock signals needed by the micro controller unit.

12. The sleep/awake circuit as claimed in claim 11, wherein the clock circuit comprises a crystal oscillator and two capacitors for providing clock signals for the bus controller.

13. A method to control sleep/awake states of an electronic device, comprising the steps of:
- placing an infrared receiving/sending module to detect user's presence at user's operation positions of an electronic device by sending and receiving infrared detecting signals;
- electrically connecting said infrared receiving/sending module with a micro-control circuit to transmit said received infrared detecting signals of said infrared receiving/sending module to said micro-control circuit, wherein said micro-control circuit comprising a micro controller unit and a serial program interface connected to said micro controller unit, said micro controller unit connected to said infrared receiving/sending module for sending command signals to said infrared receiving/sending module and receiving returned detecting signals, wherein sleep/awake control programs for said electronic device are written to the micro controller unit via the serial program interface;
- electrically connecting a manual reset switch circuit with said micro-control circuit to manually reset said micro-control circuit;
- electrically connecting said micro-control circuit with said electronic device through a bus control circuit to control sleep/awake states of said electronic device; and
- periodically sending command signals from said micro-control circuit to said infrared receiving/sending module so as to control sleep/awake states of said electronic device based on said received detecting signals from said infrared receiving/sending module.

* * * * *